United States Patent [19]

Seppänen

[11] Patent Number: 4,883,595

[45] Date of Patent: Nov. 28, 1989

[54] METHOD FOR THE EXTRACTION OF A SUBSTANCE FROM AN AQUEOUS SOLUTION

[75] Inventor: Reijo O. Seppänen, Äetsä, Finland

[73] Assignee: Oy Nokia AB, Helsinki, Finland

[21] Appl. No.: 199,557

[22] Filed: May 27, 1988

[30] Foreign Application Priority Data

May 28, 1987 [FI] Finland .................................. 872389
Oct. 8, 1987 [FI] Finland .................................. 874438

[51] Int. Cl.$^4$ .......................................... B01D 11/04
[52] U.S. Cl. .................................... 210/634; 210/511
[58] Field of Search ...................... 210/642, 511, 634

[56] References Cited

U.S. PATENT DOCUMENTS

| 3,130,156 | 4/1964 | Neff | 210/642 X |
| 3,649,219 | 3/1972 | Lynn et al. | 23/312 |
| 4,430,227 | 2/1984 | Hanson et al. | 210/642 |

Primary Examiner—Frank Spear
Attorney, Agent, or Firm—Pennie & Edmonds

[57] ABSTRACT

The invention relates to a method for separating a substance from an aqueous solution and/or for concentrating it by using an organic extractant. In the method the substance to be separated is caused to pass from the aqueous solution to the extractant, whereafter this extractant is evaporated in direct contact with the aqueous phase into which it is desired to cause the substance to be extracted to pass.

4 Claims, No Drawings

METHOD FOR THE EXTRACTION OF A SUBSTANCE FROM AN AQUEOUS SOLUTION

The invention according to the present invention relates to a method for separating a substance from an aqueous solution and/or for concentrating it by means of an organic extractant.

Liquid/liquid extraction is generally used for separating a substance dissolved in an aqueous solution from the solution. The reason for the separating may be either a need to recover a valuable substance and/or to separate it from the other components of the solution, which are to be regarded as impurities. Extraction can also be used for concentrating a substance in an aqueous solution.

In practice the extraction is carried out by contacting an aqueous solution of the substance to be recovered with a suitable water-insoluble organic extractant, into which the desired substance to be separated will pass. In general, the substance which has been recovered into an organic extractant is not treated further while it is dissolved in an organic substance, but it is again caused to pass into an aqueous solution. This step is called stripping.

The passing of a substance from one phase to another is achieved by selecting a suitable extractant, and by varying the pH, the temperature and the other variables so that, during the extraction, the conditions favor the passing of the substance into the organic phase and, during the stripping, the conditions favor the passing of the substance from the organic phase into the aqueous phase. Often the equilibriums governing the passing of the substance to be extracted from one phase to another are such that the aqueous phase obtained as a product of the stripping, containing in a purified state the substance to be extracted, has a rather low concentration of the substance to be extracted, and so the further treatment will be complicated by the low concentration of the substance and the large quantity of the solution. Concentrating the product by evaporation of water is cumbersome and energy-consuming owing to the high heat of evaporation of water, and furthermore, the product may be sensitive to high temperatures.

A typical extraction method is described in U.S. Pat. No. 3,649,219, which describes the extraction of salts from their aqueous solutions by contacting the salt-containing aqueous solution with an organic acid and a base. The obtained salt-containing organic extract is separated from the aqueous raffinate, and the salt is stripped from the extract by means of water. U.S. Pat. No. 4,430,227 discloses a method for the concentration of aqueous solutions by using polar organic liquids such as alcohols, ketones, ethers or amines. Such organic liquids are used at an elevated temperature to extract water from an aqueous solution which contains non-volatile substances. The water can be separated from the organic phase, and the organic liquid can be recycled into the process.

It has been observed surprisingly that according to the present invention a substance can be separated from its aqueous solution and/or be concentrated by means of an organic extractant without substantial losses in yield, by causing by extraction the substance to be extracted to pass from the aqueous solution into the extractant, whereafter this extractant is evaporated in direct contact with the aqueous phase into which it is desired to pass the substance to be extracted, provided that the organic solvent is sufficiently volatile. When substances sensitive to high temperatures are involved, the evaporation can be carried out under vacuum, and this is advantageous if the boiling point of the extractant is below 170° C.

In another embodiment of the method according to the invention, the substance to be extracted is caused by extraction to pass from the aqueous solution into the extractant, whereafter such an amount of solution is evaporated from this extractant that the extracted substance in part crystallizes, the remainder being left in a dissolved state. Thereafter the extractant which contains the crystals is contacted with the aqueous phase into which it is desired to pass the extracted substance. The extracted substance in a crystalline form dissolves in the aqueous phase, and also part of the extracted substance which has dissolved in the organic extractant passes into the aqueous phase, in the proportion presupposed by the extraction equilibrium.

As a consequence of the concentration, in the extractant, of the substance to be caused to pass into an aqueous phase, the extracted substance can be concentrated in the aqueous phase so as to be more highly concentrated than presupposed by the extraction equilibrium. This embodiment is advantageous in cases in which the substance to be extracted is prone to decompose and does not tolerate, for example, evaporation until dry or concentration in an aqueous solution, and in which the solvent is sufficiently volatile. Before the evaporation of the solvent, the concentrated extraction solvent coming from the treatment of the aqueous phase can be combined with the organic phase from the extraction.

By the method according to the invention the substance is obtained as an aqueous solution of the desired concentration. The used organic solvent can be recycled to the extraction stage.

The invention is especially useful for the concentration of sodium borohydride. Sodium borohydride is prepared in the form of an alkaline aqueous solution the composition of which is usually, depending on the production process, sodium borohydride approximately 12%, NaOH 40%, the balance being water. Considering transportation, the solution is rather dilute with respect to the active substance, i.e. sodium borohydride, and it is too alkaline for several specialized uses. However, for the stability of the product its aqueous solution must be alkaline. It is generally known to extract sodium borohydride from an aqueous solution by means of an organic extractant, for example isopropylamine, n-propylamine, diglyme, etc., or by means of liquid ammonia. A solid pulverous product can then be prepared by evaporating out the extractant, whereupon the product is obtained in a more or less pure form. The product is to some extent difficult to isolate, it may contain waters of crystallization, and it is hygroscopic. However, an aqueous solution of sodium borohydride, if not too alkaline, is suitable for many uses. For stabilization it suffices if the alkalinity, calculated as NaOH, is greater than 1% of the amount of the product solution.

By the method according to the invention, such an aqueous solution of sodium borohydride can be produced by separating in the first stage the sodium borohydride from a concentrated alkaline aqueous solution by extracting it in a manner known per se into some extractant, for example n-propylamine. This extraction solvent can then be evaporated in direct contact with an aqueous solution which contains a base only to the extent required by the stabilization of the aqueous solution of sodium borohydride.

According to another embodiment of the invention, after the passage of the sodium borohydride into the extractant, solution is evaporated out from the extractant to such an extent that the extracted substance, $NaBH_4$, partly crystallizes, while a portion of it remains dissolved in the extractant. The extractant which contains crystals is contacted with an aqueous phase which contains a base, whereupon part of the borohydride passes into this aqueous phase.

The aqueous solution into which $NaBH_4$ is caused to pass and concentrate by evaporating, in contact with the aqueous solution, an extractant which contains organic $NaBH_4$, can advantageously be a solution which has been prepared by diluting from a solution containing $NaBH_4$ 12% and NaOH approximately 40%, and which has the desired lye content. In this case, part of the $NaBH_4$ contained in the product is obtained without its passing via extraction.

Without limiting the invention in any way, the advantages gained by using it can briefly be described as follows:

(a) The $NaBH_4$ concentration in the product solution can be regulated within a wide range, even beyond the solubility limit.

(b) The amount of lye can be adjusted according to the intended use, provided lye is present in an amount sufficient for the purpose of stabilization.

The $NaBH_4$/NaOH ratio in the current commercial product, 12%/40%=3.17 mol/10 mol=0.317 mol $NaBH_4$/1 mol NaOH is due to the production method, and it cannot be increased with respect to $NaBH_4$.

According to the invention it is possible, for example, to prepare a solution in which the ratio $NaBH_4$/NaOH is 24%/5%=6.35 mol/1.25 mol=5.08 mol $NaBH_4$/1 mol NaOH. This has significance in the carrying out of reactions in which a high lye content is detrimental.

(c) Since the $NaBH_4$ content in the product prepared according to the invention can be raised clearly above that (12 %) in the current solution product, the quantity of solution to be transported is correspondingly reduced.

The following examples illustrate the use of the invention, without limiting it in any way.

EXAMPLE 1

125 g of n-propylamine with a $NaBH_4$ content of 10.4% was added to 50 g of a diluted sodium borohydride solution with a $NaBH_4$ content of 5.9% and a NaOH content of approximately 20%. The adding was carried out at 80° C., under normal pressure.

After evaporation, the $NaBH_4$ concentration of the borohydride solution was 24.06%. The weight of the borohydride solution after the evaporation was 65.07 g and the weight of the amine recovered was 104.91 g. The loss by using this procedure was only 2%. The concentration of sodium hydroxide in the final solution was approximately 16%.

EXAMPLE 2

316.5 g of an n-propylamine solution with an $NaBH_4$ concentration of 7.9% was added to 100 g of a borohydride solution with an $NaBH_4$ concentration of 2.1% and an NaOH concentration of approximately 7%. The adding was carried out at a temperature of 30° C., under vacuum. The amine solution was allowed to evaporate on the surface of the borohydride solution. After the evaporation the weight of the borohydride solution was 96.2 g and its $NaBH_4$ concentration was 27.5%.

| $NaBH_4$ balance: | | |
|---|---|---|
| original borohydride solution | 2.1 g | $NaBH_4$ |
| amine | 25.0 g | |
| total | 27.1 g | |
| product solution | 26.5 g | $NaBH_4$ |
| loss | 0.6 g | 2.2% |

EXAMPLE 3

135.3 g of an ethylamine having an $NaBH_4$ concentration of 13.2% was added to 93.5 g of a borohydride solution having an $NaBH_4$ concentration of 6.0%. The adding was carried out at 40° C., under vacuum. The organic solution evaporated on the surface of the aqueous phase. After the evaporation the weight of the aqueous phase was 123.6 g and its $NaBH_4$ concentration was 19.2%.

Within the determinable limits, decomposition did not occur.

EXAMPLE 4

120.9 g of ethylene diamine having an $NaBH_4$ concentration of 12.7% was added to 100.1 g of a borohydride solution having an $NaBH_4$ concentration of 6.0%. The adding was carried out at a temperature of 80° C., under vacuum. The organic solution evaporated on the surface of the aqueous phase. After the evaporation the weight of the aqueous phase was 106.5 g and its $NaBH_4$ concentration was 19.2%. The decomposition of the product was approximately 4.5%.

EXAMPLE 5

559.1 g of n-propylamine having an $NaBH_4$ concentration of 7.7% was added to 100 g of a borohydride solution having an $NaBH_4$ concentration of 6.1%. The adding was carried out at a temperature of 40° C., under vacuum. After the evaporation the weight of the aqueous phase was 114.1 g, and the phase contained crystals. Since it was difficult to take a sample of the crystalline mass, the decomposition of $NaBH_4$ was determined as a ratio of the total boron to the reducing boron. The decomposition was approximately 2.8%.

EXAMPLE 6

A solution which contained $NaBH_4$ 12 % and NaOH 40 % was extracted with n-propylamine, whereby an n-propylamine solution was obtained having an $NaBH_4$ concentration of 7.56%. Extractant was evaporated to such a degree that a portion of the $NaBH_4$ crystallized into the amine solution.

This mixture was contacted with an aqueous solution which contained NaOH 20% and $NaBH_4$ 5.99%. After mixing, the phases were allowed to settle, and the result obtained was an aqueous phase which contained $NaBH_4$ 15.25% and NaOH 23.92%. The amine residue was evaporated out from the aqueous phase, whereupon an $NaBH_4$ concentration of 15.27% was obtained.

I claim:

1. A method for separating a substance from an aqueous solution and possibly concentrating it at the same time comprising the steps of extracting said substance from the aqueous solution into an organic volatile extractant, and thereafter evaporating said extractant in direct contact with the aqueous phase into which said substance is desired to be transferred.

2. The method of claim 1 further comprising the step of evaporating said extractant including the substance to be separated and possibly concentrated, in order to concentrate and partially crystallize the extracted substance before contacting said extractant including said substance with the aqueous phase.

3. The method of claim 2 wherein said substance to be separated and possibly concentrated is sodium borohydride, and the organic volatile extractant is ammonia, an amine-function extractant, an amide-function extractant or an ether-function extractant.

4. The method of claim 1 wherein said substance to be separated and possibly concentrated is sodium borohydride, and the organic volatile extractant is ammonia, an amine-function extractant, an amide-function extractant or an ether-function extractant.

* * * * *